United States Patent
Mueller et al.

(10) Patent No.: US 10,309,039 B2
(45) Date of Patent: *Jun. 4, 2019

(54) MULTIFILAMENT, MONOFILAMENT, NON-WOVEN OR TAPE

(71) Applicant: BASF SE, Ludwigshafen (DE)

(72) Inventors: Daniel Mueller, Basel (CH);
Jean-Roch Pauquet, Kaiseraugst (CH);
Anthony Judge, Riehen (CH);
Hanspeter Meyer, Diegten (CH)

(73) Assignee: BASF SE, Ludwigshafen (DE)

( * ) Notice: Subject to any disclaimer, the term of this patent is extended or adjusted under 35 U.S.C. 154(b) by 79 days.

This patent is subject to a terminal disclaimer.

(21) Appl. No.: 15/386,395

(22) Filed: Dec. 21, 2016

(65) Prior Publication Data
US 2017/0096749 A1 Apr. 6, 2017

Related U.S. Application Data

(63) Continuation of application No. 14/267,970, filed on May 2, 2014, now Pat. No. 9,574,288, which is a continuation of application No. 12/519,387, filed as application No. PCT/EP2007/064023 on Dec. 17, 2007, now abandoned.

(30) Foreign Application Priority Data

Dec. 27, 2006 (EP) ................................. 06127222

(51) Int. Cl.
| | | |
|---|---|---|
| *C08L 9/08* | (2006.01) | |
| *D01F 1/04* | (2006.01) | |
| *D01F 1/10* | (2006.01) | |
| *D01F 6/04* | (2006.01) | |
| *D01F 6/06* | (2006.01) | |
| *D01F 6/30* | (2006.01) | |
| *D01F 6/46* | (2006.01) | |
| *C08L 23/06* | (2006.01) | |
| *C08L 23/12* | (2006.01) | |
| *E01C 13/08* | (2006.01) | |

(52) U.S. Cl.
CPC .............. *D01F 1/106* (2013.01); *C08L 9/08* (2013.01); *C08L 23/06* (2013.01); *C08L 23/12* (2013.01); *D01F 1/04* (2013.01); *D01F 6/04* (2013.01); *D01F 6/06* (2013.01); *D01F 6/30* (2013.01); *D01F 6/46* (2013.01); *E01C 13/08* (2013.01); *C08L 2201/08* (2013.01); *C08L 2205/16* (2013.01); *D10B 2321/021* (2013.01); *D10B 2401/22* (2013.01); *D10B 2505/202* (2013.01)

(58) Field of Classification Search
CPC .............. D01F 1/106; D01F 1/04; D01F 6/46; E01C 13/08; C08L 23/06; C08L 2201/08; C08L 2205/16; D10B 2505/202; D10B 2401/22

See application file for complete search history.

(56) References Cited

U.S. PATENT DOCUMENTS

| | | | |
|---|---|---|---|
| 3,740,303 A | 6/1973 | Alderson et al. | |
| 4,863,981 A | 9/1989 | Gugumus | |
| 5,795,941 A | 8/1998 | Cree et al. | |
| 6,271,377 B1 | 8/2001 | Galbo et al. | |
| 6,388,072 B2 | 5/2002 | Galbo et al. | |
| 6,747,077 B2 | 6/2004 | Gugumus et al. | |
| 9,574,288 B2 * | 2/2017 | Mueller | ............... D01F 1/106 |
| 2005/0049336 A1 | 3/2005 | Gugumus | |

FOREIGN PATENT DOCUMENTS

| | | |
|---|---|---|
| EP | 1077227 | 2/2001 |
| EP | 1338622 | 8/2003 |
| JP | 63-022560 | 1/1988 |

\* cited by examiner

*Primary Examiner* — Hai Vo
(74) *Attorney, Agent, or Firm* — Oblon, McClelland, Maier & Neustadt, L.L.P.

(57) ABSTRACT

A multifilament, a monofilament, a non-woven or a tape, each having 1 to 2000 Denier per filament and a draw ratio of 1:2 to 1:11 and each made of a composition containing the components
(A) a polyolefin,
(B) for example a compound of the formula (B-1-a-1),

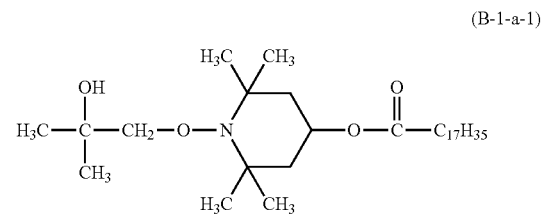

(B-1-a-1)

(C) for example a compound of the formula (C-1-b-1),

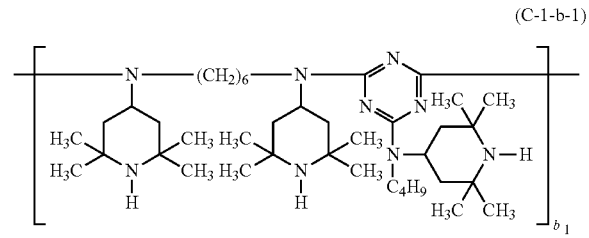

(C-1-b-1)

wherein $b_1$ is a number from 2 to 20, and
optionally
(D) one or more inorganic and/or organic pigments.

11 Claims, No Drawings

MULTIFILAMENT, MONOFILAMENT, NON-WOVEN OR TAPE

The present invention relates to a multifilament, a monofilament, a non-woven or a tape, each having 1 to 2000 Denier per filament and a draw ratio of 1:2 to 1:11 and each made of a composition containing a polyolefin, two specific sterically hindered amine compounds and optionally an inorganic and/or an organic pigment, as well as to an article made of the multifilament, the monofilament, the non-woven or the tape.

Stabilizer mixtures containing 2,2,6,6-tetramethylpiperidine derivatives are described for example in US-A-2005/049,336, U.S. Pat. No. 6,747,077, EP-A-1,338,622 and EP-A-1,077,227.

In more detail, the present invention relates to a multifilament, a monofilament, a non-woven or a tape, each having 1 to 2000 Denier per filament, preferably 1 to 1000 Denier per filament, in particular 1 to 500 Denier per filament, and a draw ratio of 1:2 to 1:11, preferably 1:3 to 1:8, in particular 1:3 to 1:6, and each made of a composition containing the components (A) a polyolefin,
(B) a compound of the formula (B-1)

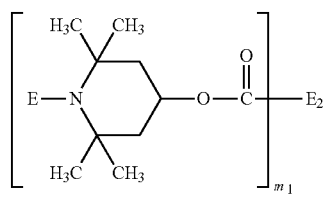

in which
E is hydrogen, $C_1$-$C_4$alkyl, $C_1$-$C_{18}$alkoxy, cyclohexyloxy, $C_2$-$C_{20}$alkanoyloxy or
a group —O-$E_1$-OH
wherein $E_1$ is $C_2$-$C_{18}$alkylene or cyclohexylene or -$E_1$-OH is a group —C($C_6H_5$)(H)$CH_2$—OH;
$m_1$ is 1 or 2,
if $m_1$ is 1, $E_2$ is $C_1$-$C_{25}$alkyl or a group

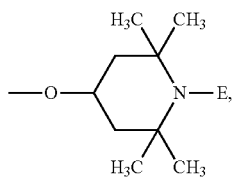

if $m_1$ is 2, $E_2$ is $C_1$-$C_{14}$alkylene;
(C) a compound of the formula (C-1)

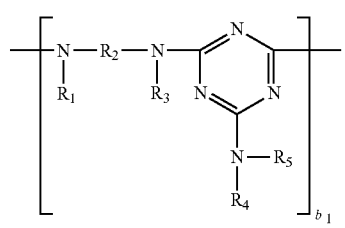

in which
$R_1$, $R_3$, $R_4$ and $R_5$ independently of one another are hydrogen, $C_1$-$C_{12}$alkyl, $C_5$-$C_{12}$cycloalkyl, $C_1$-$C_4$-alkyl-substituted $C_6$-$C_{12}$cycloalkyl, phenyl, phenyl which is substituted by —OH and/or $C_1$-$C_{10}$alkyl; $C_7$-$C_9$phenylalkyl, $C_7$-$C_9$phenylalkyl which is substituted on the phenyl radical by —OH and/or $C_1$-$C_{10}$alkyl; or a group of the formula (c-I)

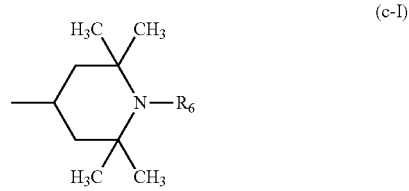

$R_2$ is $C_2$-$C_{18}$alkylene, $C_5$-$C_7$cycloalkylene or $C_1$-$C_4$alkylenedi($C_5$-$C_7$cycloalkylene),
or
the radicals $R_1$, $R_2$ and $R_3$, together with the nitrogen atoms to which they are bonded, form a 5- to 10-membered heterocyclic ring, or
$R_4$ and $R_5$, together with the nitrogen atom to which they are bonded, form a 5- to 10-membered heterocyclic ring,
$R_6$ is hydrogen, $C_1$-$C_8$alkyl, O•, —OH, —$CH_2CN$, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or
$C_1$-$C_8$acyl, and
$b_1$ is a number from 2 to 50,
with the proviso that at least one of the radicals $R_1$, $R_3$, $R_4$ and $R_5$ is a group of the formula (c-I);
a compound of the formula (C-2)

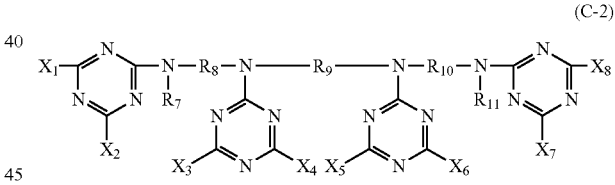

wherein
$R_7$ and $R_{11}$ independently of one another are hydrogen or $C_1$-$C_{12}$alkyl,
$R_8$, $R_9$ and $R_{10}$ independently of one another are $C_2$-$C_{10}$alkylene, and
$X_1$, $X_2$, $X_3$, $X_4$, $X_5$, $X_6$, $X_7$ and $X_8$ independently of one another are a group of the formula (c-II),

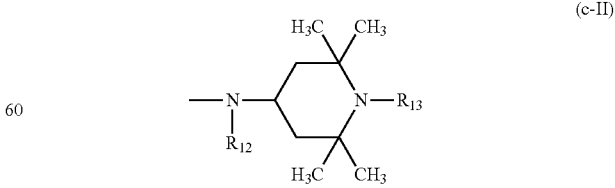

in which $R_{12}$ is hydrogen, $C_1$-$C_{12}$alkyl, $C_5$-$C_{12}$cycloalkyl, $C_1$-$C_4$alkyl-substituted $C_5$-$C_{12}$cycloalkyl, phenyl, —OH— and/or $C_1$-$C_{10}$alkyl-substituted phenyl, $C_7$-$C_9$phenylalkyl, $C_7$-$C_9$phenylalkyl which is substituted on the phenyl radical by —OH and/or $C_1$-$C_{10}$alkyl; or a group of the formula (c-I) as defined above, and $R_{13}$ has one of the meanings of $R_6$;

a compound of the formula (C-3)

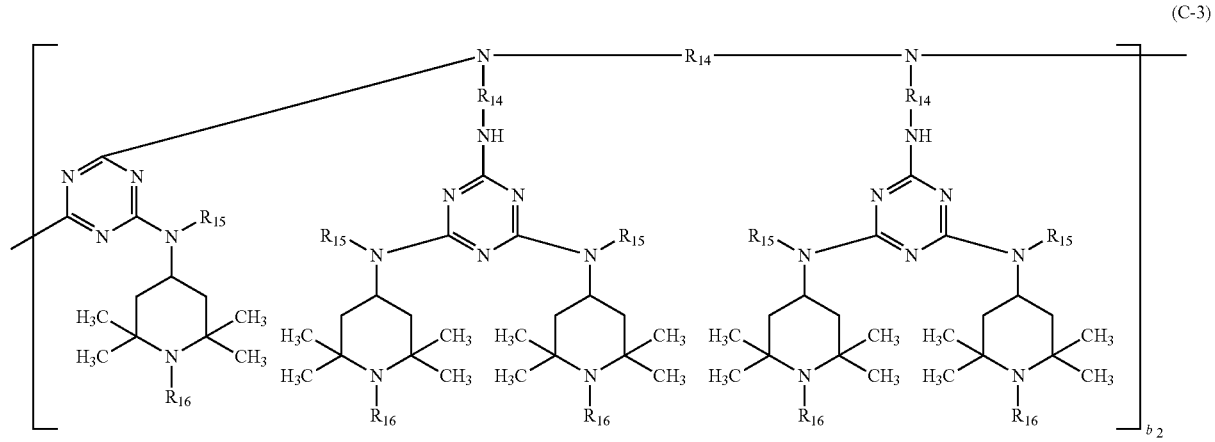

(C-3)

wherein $b_2$ is a number from 2 to 50;

the radicals $R_{14}$ independently of one another are $C_2$-$C_{10}$alkylene;

the radicals $R_{15}$ independently of one another are hydrogen, $C_1$-$C_{12}$alkyl, $C_5$-$C_{12}$cycloalkyl, phenyl or $C_7$-$C_9$phenylalkyl, and the radicals $R_{16}$ independently of one another have one of the meanings of $R_6$;

a compound of the formula (C-4)

(C-4)

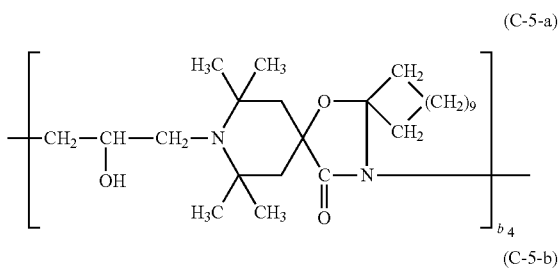

in which $R_{17}$ and $R_{21}$ independently of one another are a direct bond or a —N($X_9$)—CO—$X_{10}$—CO—N($X_{11}$)— group, where $X_9$ and $X_{11}$ independently of one another are hydrogen, $C_1$-$C_8$alkyl, $C_5$-$C_{12}$cycloalkyl, phenyl, $C_7$-$C_9$phenylalkyl or a group of the formula (c-I), $X_{10}$ is a direct bond or $C_1$-$C_4$alkylene, $R_{18}$ has one of the meanings of $R_6$, $R_{19}$, $R_{20}$, $R_{23}$ and $R_{24}$ independently of one another are hydrogen, $C_1$-$C_{30}$alkyl, $C_5$-$C_{12}$cycloalkyl or phenyl, $R_{22}$ is hydrogen, $C_1$-$C_{30}$alkyl, $C_5$-$C_{12}$cycloalkyl, phenyl, $C_7$-$C_9$phenylalkyl or a group of the formula (c-I), and $b_3$ is a number from 1 to 50; or a compound of the formula (C-5-a) or (C-5-b)

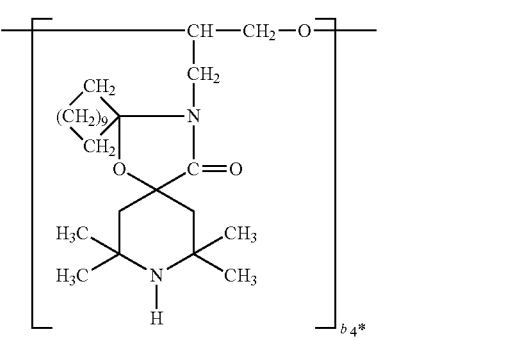

(C-5-a)

(C-5-b)

wherein $b_4$ and $b_4{}^*$ are a number from 2 to 50;

and optionally (D) one or more inorganic and/or organic pigments.

E is in particular a group —O—$E_1$—OH.

A non-woven is in particular a spun bonded or carded web (e.g. needle punched, nonbonded, chemically bonded or hydroentangled) made of staple fibers.

Preferred is a multifilament, a monofilament, a non-woven or a tape, containing the components (A), (B), (C) and (D).

Examples of component (A) are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be cross-linked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:
 a) radical polymerisation (normally under high pressure and at elevated temperature).
 b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The polyolefins listed above under point 1 are preferred. Polyethylene, polypropylene, an ethylene copolymer or a propylene copolymer or mixtures thereof are particularly preferred.

Examples of alkyl having up to 30 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, iso-heptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl, docosyl and triacontyl. One of the preferred definitions of $E_2$ is $C_{15}$-$C_{17}$alkyl. One of the preferred definitions of $R_6$, $R_{13}$, $R_{16}$ and $R_{18}$ is $C_1$-$C_4$alkyl, especially methyl.

Examples of alkoxy having up to 18 carbon atoms are methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. One of the preferred meanings of $R_6$ and $R_{13}$ is propoxy.

Examples of $C_2$-$C_{20}$alkanoyloxy are methanoyloxy, ethanoyloxy, propanoyloxy, butanoyloxy, pentanoyloxy, hexanoyloxy, heptanoyloxy, octanoyloxy, nonanoyloxy and decanoyloxy.

Examples of $C_5$-$C_{12}$cycloalkyl are cyclopentyl, cyclohexyl, cycloheptyl, cyclooctyl and cyclododecyl. $C_5$-$C_8$Cycloalkyl, especially cyclohexyl, is preferred.

$C_1$-$C_4$Alkyl-substituted $C_5$-$C_{12}$cycloalkyl is for example methylcyclohexyl or dimethylcyclohexyl.

Examples of $C_5$-$C_{12}$cycloalkoxy are cyclopentoxy, cyclohexoxy, cycloheptoxy, cyclooctoxy, cyclodecyloxy and cyclododecyloxy. $C_5$-$C_8$Cycloalkoxy, in particular cyclopentoxy and cyclohexoxy, is preferred.

—OH— and/or $C_1$-$C_{10}$alkyl-substituted phenyl is for example methylphenyl, dimethylphenyl, trimethylphenyl, tert-butylphenyl or 3,5-di-tert-butyl-4-hydroxyphenyl.

Examples of $C_7$-$C_9$phenylalkyl are benzyl and phenylethyl.

$C_7$-$C_9$Phenylalkyl which is substituted on the phenyl radical by —OH and/or by alkyl having up to 10 carbon atoms is for example methylbenzyl, dimethylbenzyl, trimethylbenzyl, tertbutylbenzyl or 3,5-di-tert-butyl-4-hydroxybenzyl.

Examples of alkenyl having up to 6 carbon atoms are allyl, 2-methallyl, butenyl, pentenyl and hexenyl. Allyl is preferred. The carbon atom in position 1 is preferably saturated.

Examples of acyl containing not more than 8 carbon atoms are formyl, acetyl, propionyl, butyryl, pentanoyl, hexanoyl, heptanoyl, octanoyl, acryloyl, methacryloyl and benzoyl. $C_1$-$C_8$Alkanoyl, $C_3$-$C_8$alkenoyl and benzoyl are preferred. Acetyl and acryloyl are especially preferred.

Examples of alkylene having up to 18 carbon atoms are methylene, ethylene, propylene, trimethylene, tetramethylene, pentamethylene, 2,2-dimethyltrimethylene, hexamethylene, trimethylhexamethylene and octamethylene.

An example of $C_5$-$C_7$cycloalkylene is cyclohexylene.

An example of $C_1$-$C_4$alkylenedi($C_5$-$C_7$cycloalkylene) is methylenedicyclohexylene.

Where the radicals $R_1$, $R_2$ and $R_3$, together with the nitrogen atoms to which they are attached, form a 5- to 10-membered heterocyclic ring, this ring is for example

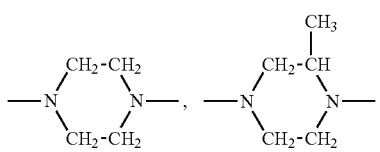

A 6-membered heterocyclic ring is preferred.

Where the radicals $R_4$ and $R_5$, together with the nitrogen atom to which they are attached, form a 5- to 10-membered heterocyclic ring, this ring is for example 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. Morpholino is particularly preferred.

One of the preferred definitions of $R_{19}$ and $R_{23}$ is phenyl.

$b_1$ is preferably a number from 2 to 25, in particular 2 to 20.

$b_2$ is preferably a number from 2 to 20, in particular 2 to 10.

$b_3$ is preferably a number from 1 to 25, in particular 1 to 20.

$b_4$ and $b_4^*$ are preferably a number from 2 to 25, in particular 2 to 20.

The compounds described above as components (B) and (C) are essentially known and commercially available. All of them can be prepared by known methods.

The preparation of the compounds of component (B) is disclosed for example in GB-A-2,347,928.

The preparation of the compounds of component (C) is disclosed for example in U.S. Pat. Nos. 4,086,204, 6,046,304, 4,331,586, 4,108,829, WO-A-94/12,544 (Derwent 94-177,274/22), DD-A-262,439 (Derwent 89-122,983/17), U.S. Pat. Nos. 4,857,595, 4,477,615, CAS 136,504-96-6, U.S. Pat. No. 4,340,534 and WO-A-98/51,690.

Component (B) is for example DASTIB 845®, ADK Stab LA 81®, TINUVIN 770® or TINUVIN 123®.

Component (C) is preferably selected from the group consisting of the following commercial products: CHIMASSORB 944®, CHIMASSORB 2020®, CYASORB UV 3346®, CYASORB UV 3529®, DASTIB 1082®, CHIMASSORB 119®, UVASORB HA 88®, UVINUL 5050 H®, LICHTSCHUTZSTOFF UV 31®, LUCHEM HA B 18® and HOSTAVIN N 30®.

The meanings of the terminal groups which saturate the free valences in the compounds of the formulae (C-1), (C-3), (C-4), (C-5-a) and (C-5-b) depend on the processes used for their preparation. The terminal groups can also be modified after the preparation of the compounds.

If the compounds of the formula (C-1) are prepared by reacting a compound of the formula

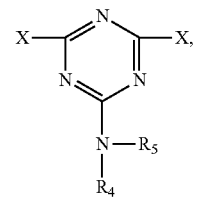

in which X is, for example, halogen, in particular chlorine, and $R_4$ and $R_5$ are as defined above, with a compound of the formula

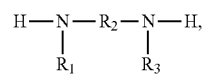

in which $R_1$, $R_2$ and $R_3$ are as defined above, the terminal group bonded to the diamino radical is hydrogen or

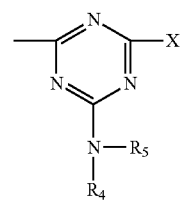

and the terminal group bonded to the triazine radical is X or

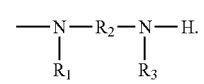

If X is halogen, it is advantageous to replace this, for example, by —OH or an amino group when the reaction is complete. Examples of amino groups which may be mentioned are pyrrolidin-1-yl, morpholino, —NH$_2$, —N(C$_1$-C$_8$)alkyl)$_2$ and —NR(C$_1$-C$_8$alkyl), in which R is hydrogen or a group of the formula (c-I).

The compounds of the formula (C-1) also cover compounds of the formula

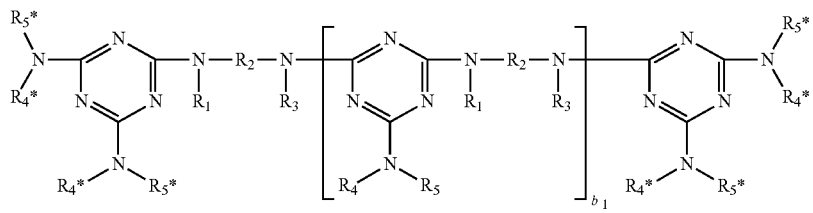

wherein $R_1$, $R_2$, $R_3$, $R_4$, $R_5$ and $b_1$ are as defined above and $R_4^*$ has one of the meanings of $R_4$ and $R_5^*$ has one of the meanings of $R_5$.

One of the particularly preferred compounds of the formula (C-1) is

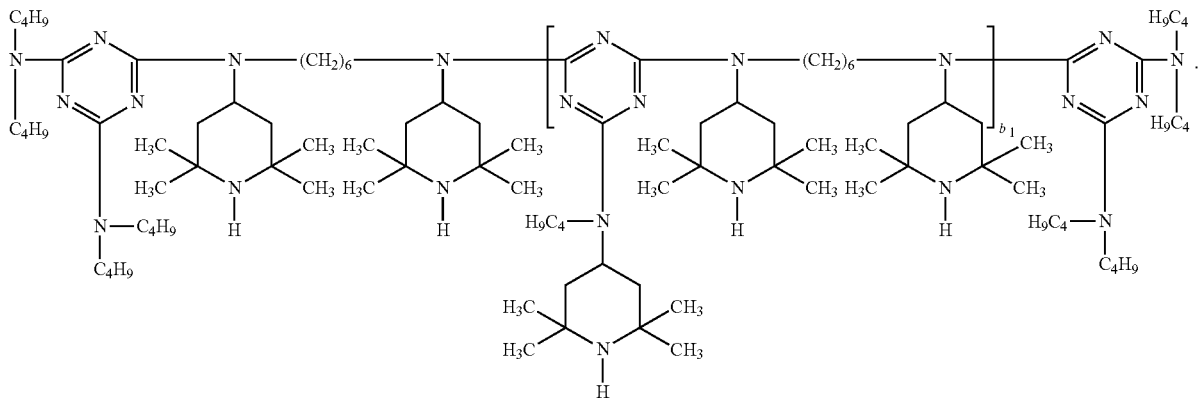

The preparation of this compound is described in Example 10 of U.S. Pat. No. 6,046,304.

In the compounds of the formula (C-3), the terminal group bonded to the triazine radical is, for example, Cl or a

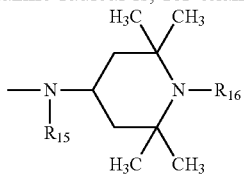

group, and the terminal group bonded to the amino radical is, for example, hydrogen or a

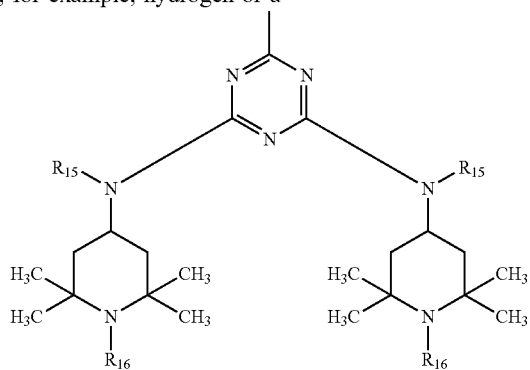

group.

In the compounds of the formula (C-4), the terminal group bonded to the 2,5-dioxopyrrolidine ring is, for example, hydrogen, and the terminal group bonded to the —C($R_{23}$)($R_{24}$)— radical is, for example,

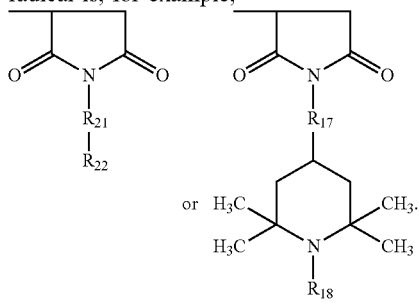

In the compounds of the formula (C-5-a), the terminal group bonded to the nitrogen can be, for example, hydrogen and the terminal group bonded to the 2-hydroxypropylene radical can be, for example, a

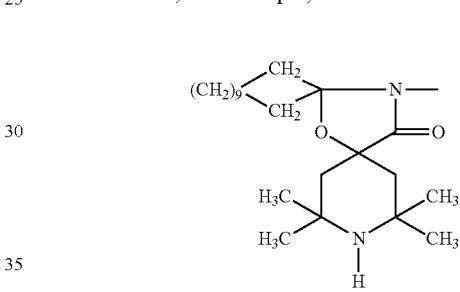

group.

In the compounds of the formula (C-5-b), the terminal group bonded to the dimethylene radical can be, for example, —OH, and the terminal group bonded to the oxygen can be, for example, hydrogen. The terminal groups can also be polyether radicals.

Examples of inorganic pigments are titanium dioxide, zinc oxide, zinc ferrite, carbon black, cadmium sulfide, cadmium selenide, chromium oxide, iron oxide, lead oxide, lead chromates, bismuth vanadate and so on. $TiO_2$ is one of the preferred examples of component (D).

Examples of organic pigments are azo and azo-condensation pigments, anthraquinones, phthalocyanines, tetrachloroisoindolinones, quinacridones, isoindolines, perylenes, pyrrolopyrroles (such as Pigment Red 254), metal complex pigments and so on.

All pigments described in "Gächter/Müller: Plastics Additives Handbook, 3rd Edition, Hanser Publishers, Munich Vienna New York", page 647 to 659, point 11.2.1.1 to 11.2.4.2 can be used as component (D).

Examples of such inorganic pigments are:
C.I. (Colour Index) Pigment Yellow 34, C.I. Pigment Yellow 119; C.I. Pigment Yellow 184, C.I. Pigment Red 101.

Examples of such organic pigments are:
C.I. Pigment Yellow 93, C.I. Pigment Yellow 95, C.I. Pigment Yellow 109; C.I. Pigment Yellow 110; C.I. Pigment Yellow 128, C.I. Pigment Yellow 138, C.I. Pigment Yellow 139, C.I. Pigment Yellow 150, C.I. Pigment Yellow 155, C.I. Pigment Yellow 162, C.I. Pigment Yellow 168, C.I. Pigment Yellow 180, C.I. Pigment Yellow 183, C.I. Pigment Yellow 199, C.I. Pigment Red 44, C.I. Pigment Red 170, C.I. Pigment Red 202, C.I. Pigment Red 214, C.I. Pigment Red 254, C.I. Pigment Red 264, C.I. Pigment Red 272, C.I. Pigment Red 283, C.I. Pigment Red 48:2, C.I. Pigment Red 48:3, C.I. Pigment Red 53:1, C.I. Pigment Red 57:1, C.I. Pigment Green 7, C.I. Pigment Blue 15:1, C.I. Pigment Blue 15:3 and C.I. Pigment Violet 19.

C.I. Pigment Yellow 93 and C.I. Pigment Blue 15:3 are particularly preferred.

A further example of a yellow pigment which can be used according to the present invention is Pigment Yellow 108.

A red pigment such as e.g. Ciba®CROMOPHTAL®Red BNFP®, a yellow pigment such as e.g. Ciba®CROMOPHTAL®Yellow 3GNP® or a blue pigment such as e.g. Ciba®CROMOPHTAL®Blue 4GNP® is also preferred as component (D).

Component (B) is preferably a compound of the formula (B-1-a-0), (B-1-a-1), (B-1-a-2), (B-1-a-3) or (B-1-b);

(B-1-a-0)

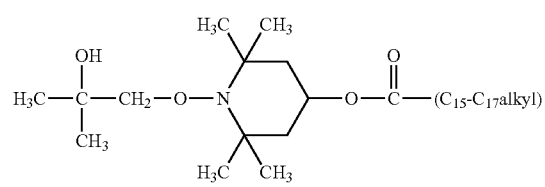

(B-1-a-1)

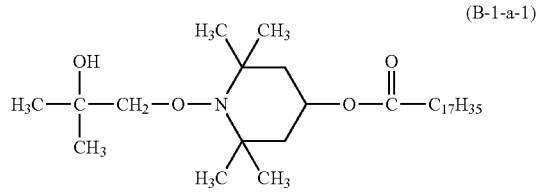

(B-1-a-2)

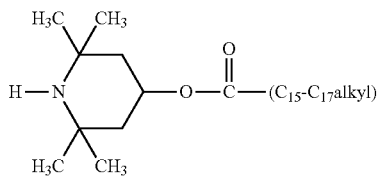

(B-1-a-3)

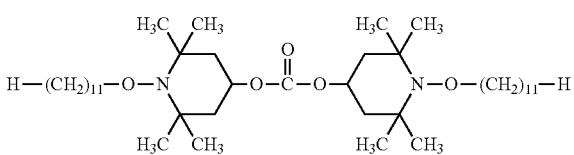

(B-1-b)

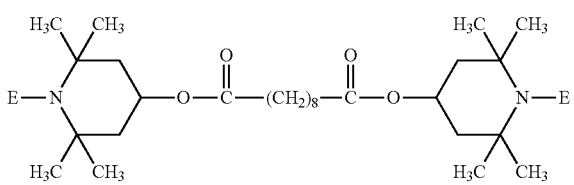

wherein the radicals E are identical and are hydrogen, methyl, octyloxy or cyclohexyloxy.

The compound of the formula (B-1-a-1) is of particular interest.

Component (C) is preferably a compound of the formula (C-1-a), (C-1-b), (C-1-c), (C-1-d), (C-2-a), (C-3-a), (C-4-a), (C-4-b), (C-4-c), (C-5-a) or (C-5-b);

(C-1-a)

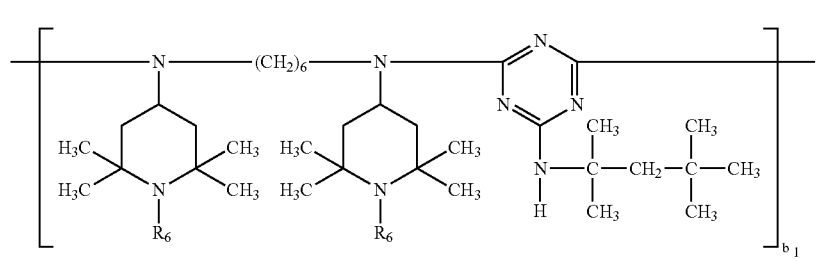

(C-1-b)

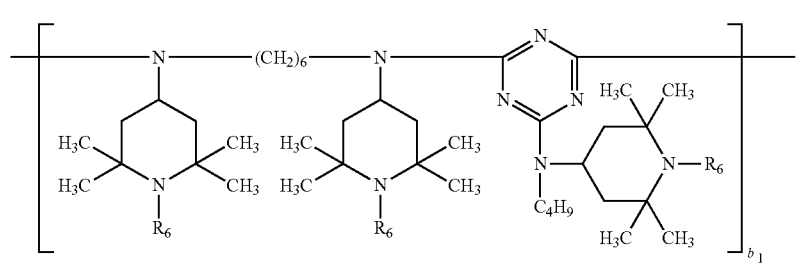

(C-1-c)

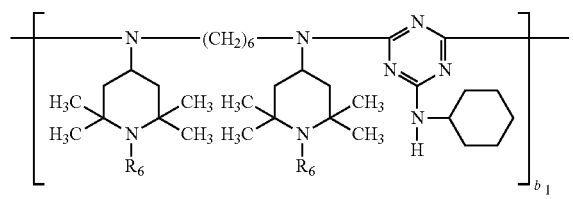

(C-1-d)

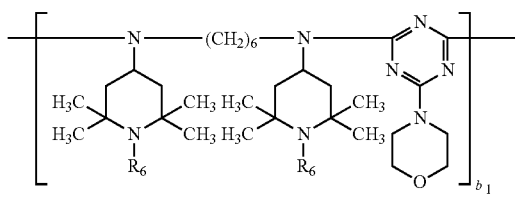

wherein
b₁ is a number from 2 to 20 and
$R_6$ is hydrogen, $C_1$-$C_8$alkyl, O·, —OH, —CH$_2$CN, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl;
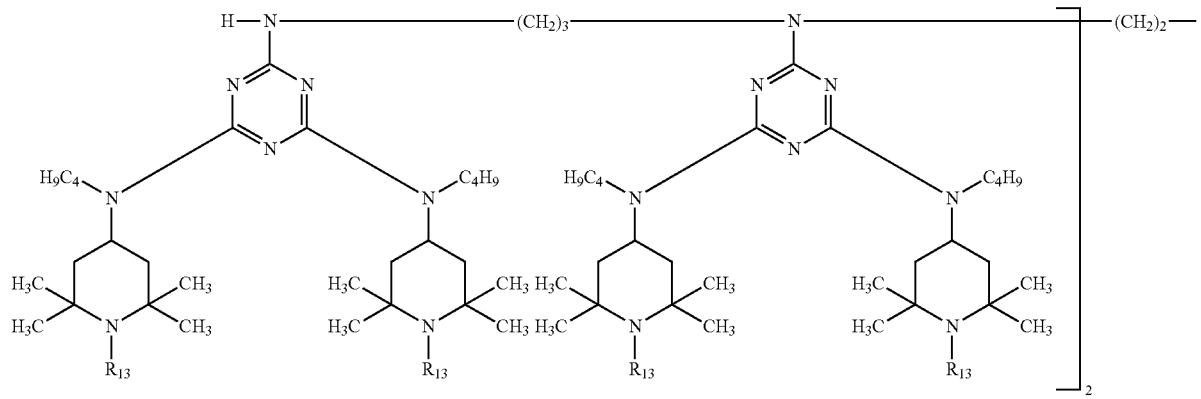
(C-2-a)
wherein $R_{13}$ has one of the meanings of $R_6$;
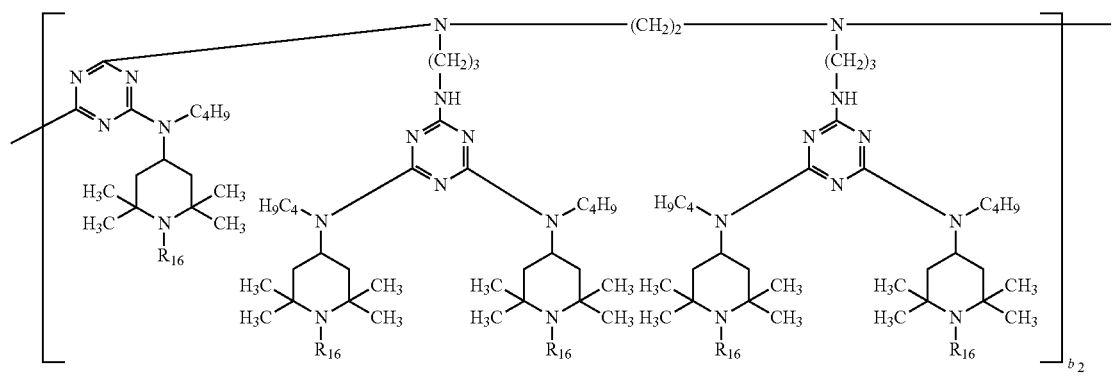
(C-3-a)
wherein $b_2$ is a number from 2 to 20 and $R_{16}$ has one of the meanings of $R_6$;
-continued
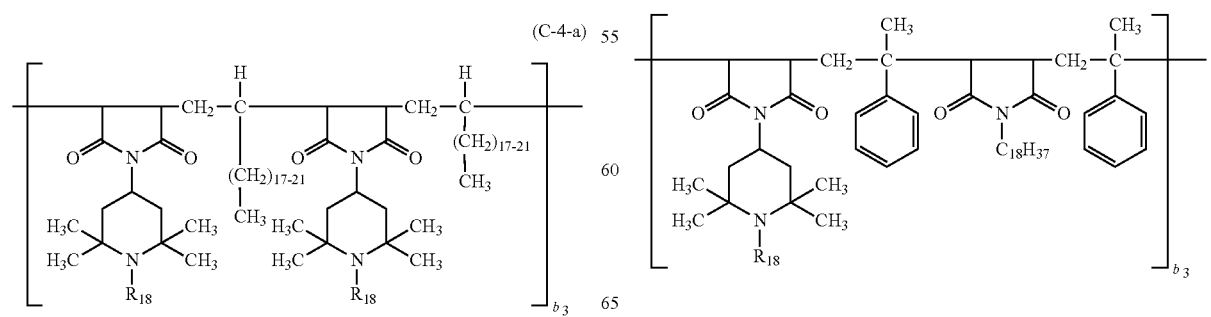
(C-4-a) (C-4-b)

-continued

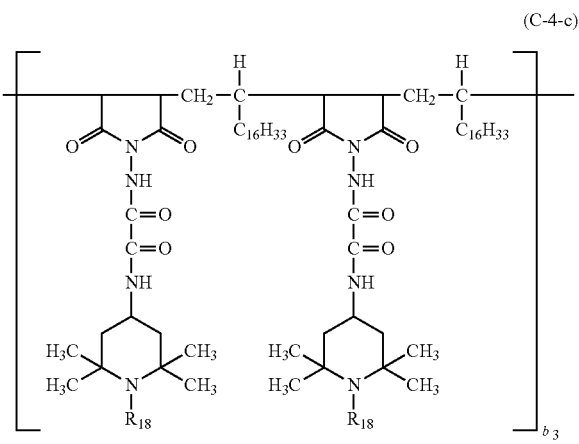

(C-4-c)

wherein $b_3$ is a number from 1 to 20 and $R_{18}$ has one of the meanings of $R_6$;

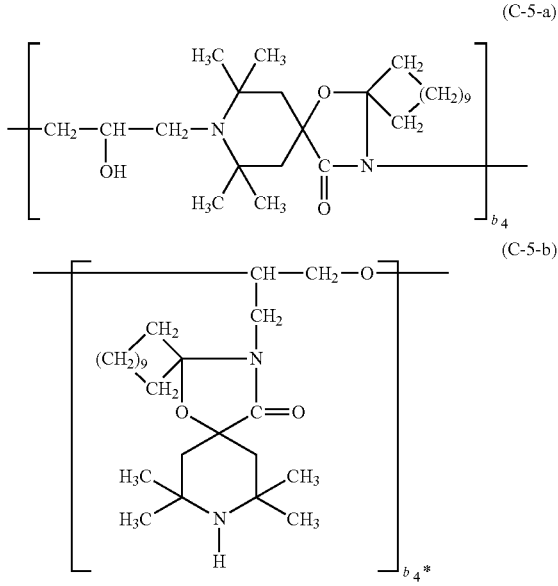

(C-5-a)

(C-5-b)

wherein
$b_4$ and $b_4^*$ are a number from 2 to 20.

The radicals $R_6$, $R_{13}$, $R_{16}$ and $R_{18}$ are preferably hydrogen, $C_1$-$C_4$alkyl or $C_1$-$C_4$alkoxy.

A preferred embodiment of the present invention relates a multifilament, a monofilament, a non-woven or a tape according to claim 1, wherein
component (B) is a compound of the formula (B-1-a-1)

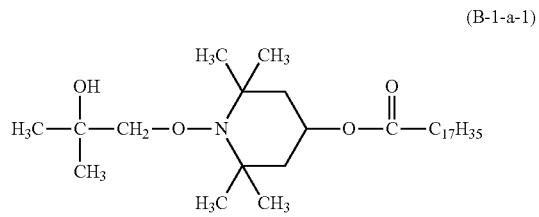

(B-1-a-1)

and component (C) is a compound of the formula (C-1-b-1).

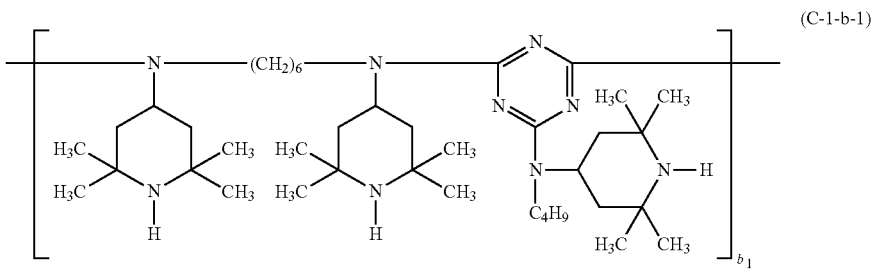

(C-1-b-1)

wherein $b_1$ is a number from 2 to 20.

A further preferred embodiment of the present invention relates to a multifilament, a monofilament, a non-woven or a tape as defined above, containing as additional component (E) an UV absorber.

The UV absorber of component (E) is preferably a 2-(2'-hydroxyphenyl)benzotriazole, a 2-hydroxybenzophenone, an ester of substituted or unsubstituted benzoic acid, an acrylate, an oxamide, a 2-(2-hydroxyphenyl)-1,3,5-triazine, a monobenzoate of resorcinol or a form amidine.

The 2-(2'-hydroxyphenyl)benzotriazole is for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methyl-phenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2- isooctyloxycarbonylethyl)phenylbenzotriazole, 2,2'-methylene-bis[4-(1,1,3,3-tetramethylbutyl)-6-benzotriazole-2-ylphenol] or the transesterification product of 2-[3'-tert-butyl-5'-(2-methoxycarbonylethyl)-2'-hydroxyphenyl]-2H-benzotriazole with polyethylene glycol 300.

2-(3',5'-Di-tert-butyl-2'-hydroxyphenyl)-5-chloro-benzotriazole, 2-(3'-tert-butyl-2'-hydroxy-5'-methylphenyl)-5-chloro-benzotriazole, 2-(3',5'-bis-(α,α-dimethylbenzyl)-2'-hydroxyphenyl)benzotriazole and 2-(3',5'-di-tert-amyl-2'-hydroxyphenyl)-benzotriazole are preferred.

The 2-hydroxybenzophenone is for example the 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivatives. 2-Hydroxy-4-octyloxybenzophenone is preferred.

The ester of a substituted or unsubstituted benzoic acid is for example 4-tert-butyl-phenyl salicylate, phenyl salicylate, octylphenyl salicylate, dibenzoyl resorcinol, bis(4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate or 2-methyl-4,6-di-tert-butylphenyl 3,5-di-tert-butyl-4-hydroxybenzoate.

2,4-Di-tert-butylphenyl 3,5-di-tert-butyl-4-hydroxybenzoate and hexadecyl 3,5-di-tert-butyl-4-hydroxybenzoate are preferred.

The acrylate is for example ethyl α-cyano-β,β-diphenylacrylate, isooctyl α-cyano-β,β-diphenylacrylate, methyl α-carbomethoxycinnamate, methyl α-cyano-β-methyl-β-methoxy-cinnamate, butyl α-cyano-β-methyl-p-methoxycinnamate, methyl α-carbomethoxy-p-methoxycinnamate or N-(β-carbomethoxy-β-cyanovinyl)-2-methylindoline.

The oxamide is for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide or its mixture with 2-ethoxy-2'-ethyl-5,4'-di-tert-butoxanilide or mixtures of ortho- and para-methoxy-disubstituted oxanilides or mixtures of o- and p-ethoxy-disubstituted oxanilides.

The 2-(2-hydroxyphenyl)-1,3,5-triazine is for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine or 2-(2-hydroxy-4-(2-ethylhexyl)oxy)phenyl-4,6-di(4-phenyl-phenyl)-1,3,5-triazine.

2-(2-Hydroxy-4-octyloxyphenyl)-4,6-bis(2,4-dimethylphenyl)-1,3,5-triazine, 2-(2-hydroxy-4-hexyloxy)phenyl-4, 6-diphenyl-1,3,5-triazine and 2-(2-hydroxy-4-(2-ethylhexyl)oxy)phenyl-4,6-di(4-phenyl-phenyl)-1,3,5-triazine are preferred.

The monobenzoate of resorcinol is for example the compound of the formula

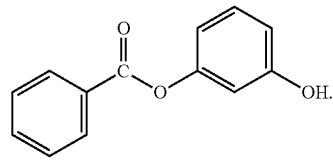 [SMILES: O=C(Oc1cccc(O)c1)c1ccccc1]

The formamidine is for example the compound of the formula

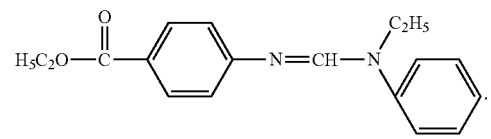

The UV absorber of component (E) is preferably a 2-(2'-hydroxyphenyl)benzotriazole, a 3,5-di-tert-butyl-4-hydroxybenzoate or a 2-(2-hydroxyphenyl)-1,3,5-triazine; in particular 2-(3',5'-bis-(α,α-dimethylbenzyl)-2'-hydroxyphenyl)benzotriazole, 2,4-di-tert-butylphenyl 3,5-di-tert-butyl-4-hydroxybenzoate or 2-(2-hydroxy-4-(2-ethylhexyl)oxy)phenyl-4,6-di(4-phenyl-phenyl)-1,3,5-triazine.

The multifilament, the monofilament, the non-woven or the tape according to the present invention may optionally contain one or more conventional additives. Examples are:

1. Antioxidants 1.1. Alkylated Monophenols for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and Alkylated Hydroquinones for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl- 4-hydroxyanisole, 3,5-di-tert-butyl-4-hydroxyphenyl stearate, bis(3,5-di-tert-butyl-4-hydroxyphenyl) adipate.

1.4. Tocopherols for example α-tocopherol, β-tocopherol, γ-tocopherol, δ-tocopherol and mixtures thereof (vitamin E).

1.5. Hydroxylated Thiodiphenyl Ethers for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidenebisphenols for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-Benzyl Compounds for example 3,5,3',5'-tetra-tert-butyl-4,4'-dihydroxydibenzyl ether, octadecyl-4-hydroxy-3,5-dimethylbenzyl mercaptoacetate, tridecyl-4-hydroxy3,5-di-tert-butylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl-3,5-di-tert-butyl-4-hydroxybenzylmercaptoacetate.

1.8. Hydroxybenzylated Malonates for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic Hydroxybenzyl Compounds for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethyl benzene, 2,4,6-tris(3,5-di-tert-butyl-4-hydroxybenzyl)phenol.

1.10. Triazine Compounds for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl)isocyanurate.

1.11. Benzylphosphonates for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugar®XL-1, supplied by Uniroyal).

1.18. Ascorbic Acid (Vitamin C)

1.19. Aminic Antioxidants for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octyl-phenothiazines, a mixture of mono- and dialkylated tert-octyl-phenothiazines, N-allylphenothiazine, N,N,N',N'-tetraphenyl-1,4-diaminobut-2-ene.

2. UV Absorbers and Light Stabilizers

2.1. 2-(2'-(2-Hydroxyphenyl)benzotriazoles for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxy-phenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones for example the 4-hydroxy, 4-methoxy, 4-octyloxy, 4-decyloxy, 4-dodecyloxy, 4-benzyloxy, 4,2',4'-trihydroxy and 2-hydroxy-4,4'-dimethoxy derivatives.

2.3. Esters of Substituted and Unsubstituted Benzoic Acids for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxy-cinnamate, methyl α-carbomethoxy-p-methoxycinnamate, N-(β-carbomethoxy-(β-cyanovinyl)-2-methylindoline, neopentyl tetra(α-cyano-β,β-diphenylacrylate.

2.5. Nickel Compounds for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tertbutyl-benzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically Hindered Amines for example carbonic acid bis(1-undecyloxy-2,2,6,6-tetramethyl-4-piperidyl)ester, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxo-spiro-[4,5]decane and epichlorohydrin, 1,1-bis(1,2,2,6,6-pentamethyl-4-piperidyloxycarbonyl)-2-(4-methoxyphenyl)ethene, N,N'-bisformyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl)ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

2.7. Oxamides for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dim ethyl phenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal Deactivators for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl) thiopropionyl dihydrazide.

4. Phosphites and Phosphonites for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2''-nitrilo-[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos®168, Ciba Specialty Chemicals Inc.), tris(nonylphenyl) phosphite,

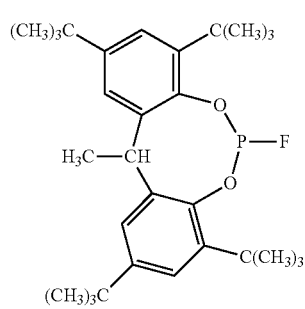
(A)

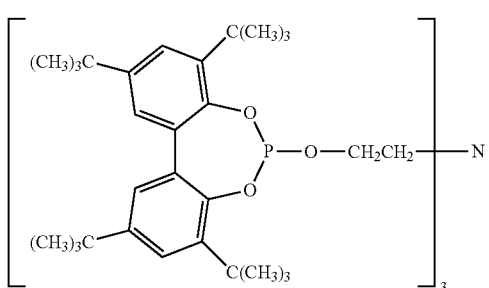
(B)

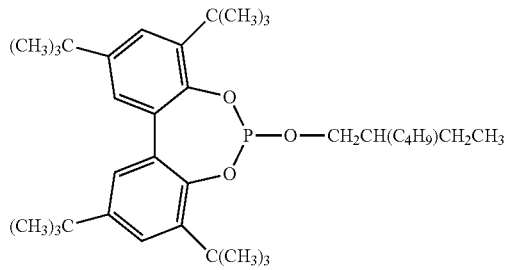
(C)

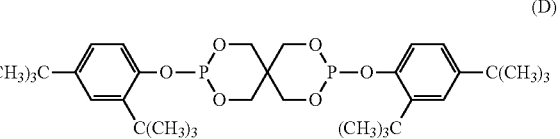
(D)

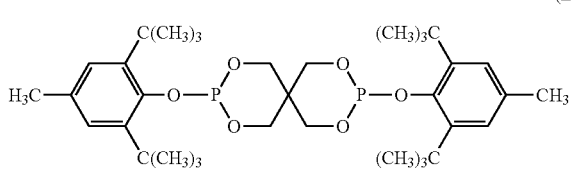
(E)

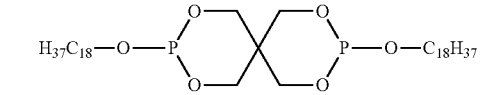
(F)

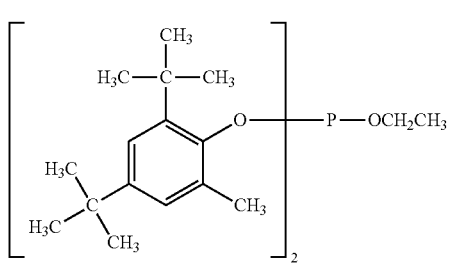
(G)

5. Hydroxylamines for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones for example, N-benzyl-alpha-phenylnitrone, N-ethyl-alpha-methylnitrone, N-octylalpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists for example dilauryl thiodipropionate, dimistryl thiodipropionate, distearyl thiodipropionate or distearyl disulfide.

8. Peroxide Scavengers for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide Stabilizers for example copper salts in combination with iodides and/or phosphorus compounds and salts of divalent manganese.

10. Basic Co-Stabilizers for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating Agents for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and Reinforcing Agents for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

13. Other Additives for example plasticisers, lubricants, emulsifiers, pigments, rheology additives, catalysts, flow-control agents, optical brighteners, flameproofing agents, antistatic agents and blowing agents.

14. Benzofuranones and Indolinones for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetyl-5-isooctylphenyl)-5-isooctyl-benzofuran-2-one.

The conventional additive as listed above is optionally present in the multifilament, the monofilament, the non-woven or the tape in an amount of for example 0.001 to 10%, preferably 0.01 to 5%, relative to the weight of component (A).

Component (B) is present in the multifilament, the monofilament, the non-woven or the tape in an amount of for example 0.025 to 1.5%, preferably 0.05 to 1%, relative to the weight of component (A).

Component (C) is present in the multifilament, the monofilament, the non-woven or the tape in an amount of for example 0.025 to 1.5%, preferably 0.05 tot %, relative to the weight of component (A).

Component (D) is present in the multifilament, the monofilament, the non-woven or the tape in an amount of for example 0 to 3%, preferably 0 to 2%, relative to the weight of component (A).

Component (E) is present in the multifilament, the monofilament, the non-woven or the tape in an amount of for example 0 to 0.5%, preferably 0 to 0.3%, relative to the weight of component (A).

A further embodiment of the present invention relates to an article comprising a multifilament, a monofilament, a non-woven or a tape as defined above and being selected from the group consisting of a carpet, for example a sport surface or an artificial turf; a roofing membrane, a geotextile, an automotive polyolefin structure, for example a kick panel, a back sheet or a trunk liner; and a shade cloth.

An interior pigmented automotive polyolefin structure is of particular interest.

A green artificial turf is also particularly preferred.

An artificial turf comprising a multifilament, a monofilament, a non-woven or a tape and containing a yellow pigment may also be of interest.

An artificial turf comprising a multifilament, a monofilament, a non-woven or a tape as defined above, wherein component D is
a pigment formulation containing C.I. Pigment Green 7 and C.I. Pigment Yellow 110; or
a pigment formulation containing C.I. Pigment Green 7 and C.I. Pigment Yellow 128; or
a pigment formulation containing C.I. Pigment Green 7 and C.I. Pigment Yellow 199; or
a pigment formulation containing C.I. Pigment Green 7 and C.I. Pigment Yellow 34; or
a pigment formulation containing C.I. Pigment Green 7 and C.I. Pigment Yellow 119; or
a pigment formulation containing C.I. Pigment Green 7 and C.I. Pigment Yellow 150;
is of further interest.

An artificial turf comprising a multifilament, a monofilament, a non-woven or a tape as defined above, containing additionally a shading component selected from the group consisting of C.I. Pigment Black 7, C.I. Pigment White 6, C.I. Pigment Red 101 and C.I. Pigment Blue 15:3; is of further interest.

According to another preferred embodiment of the present invention the article containing a multifilament, a monofilament, a non-woven or a tape as defined above is in contact with a latex or a rubber.

Examples of said latex or rupper are styrene butadiene rubber (SBR), coated SBR, ethylene propylene diene elastomer (EPDM) new or recycled and thermoplastic elastomer (TPE) new or recycled.

The example below illustrates the invention in greater detail. All percentages and parts are by weight, unless stated otherwise.

Light stabilizers used in the following examples:

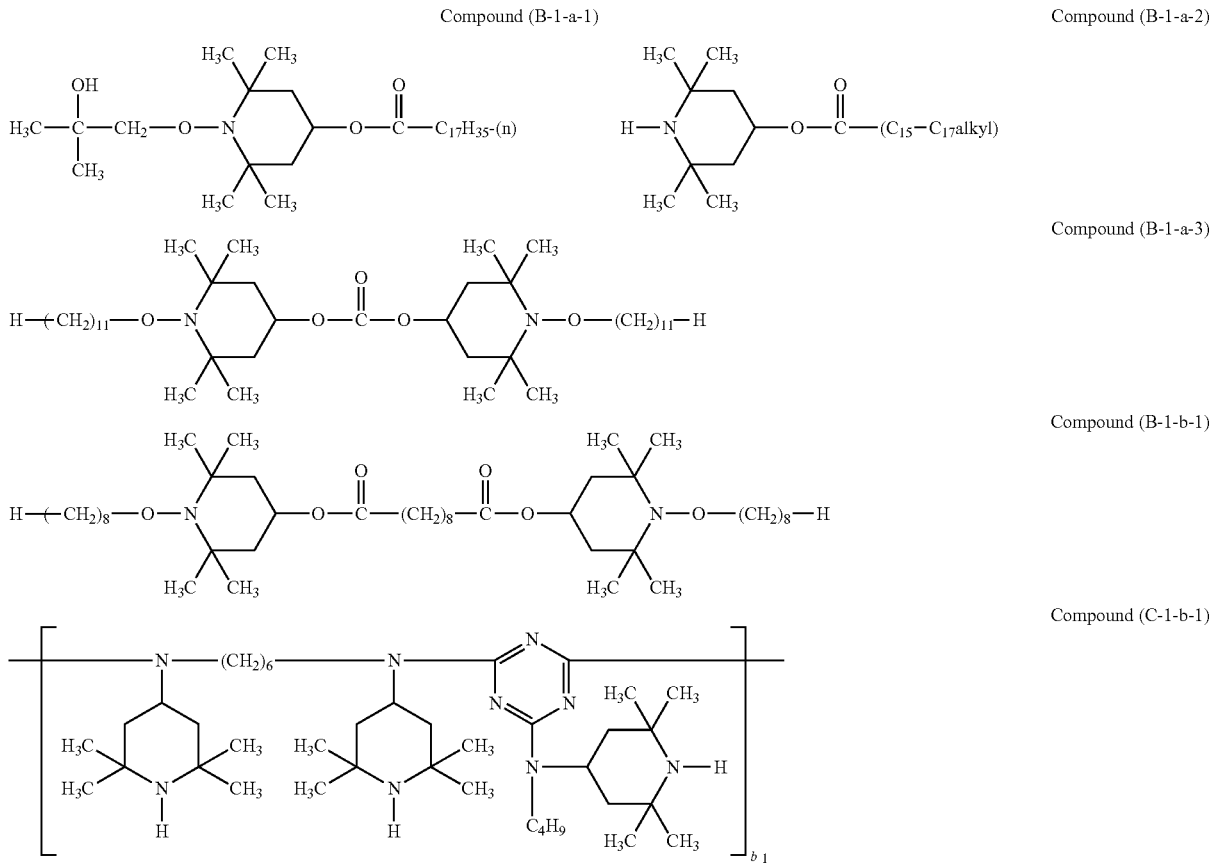

with $b_1$ being 2 to 20.

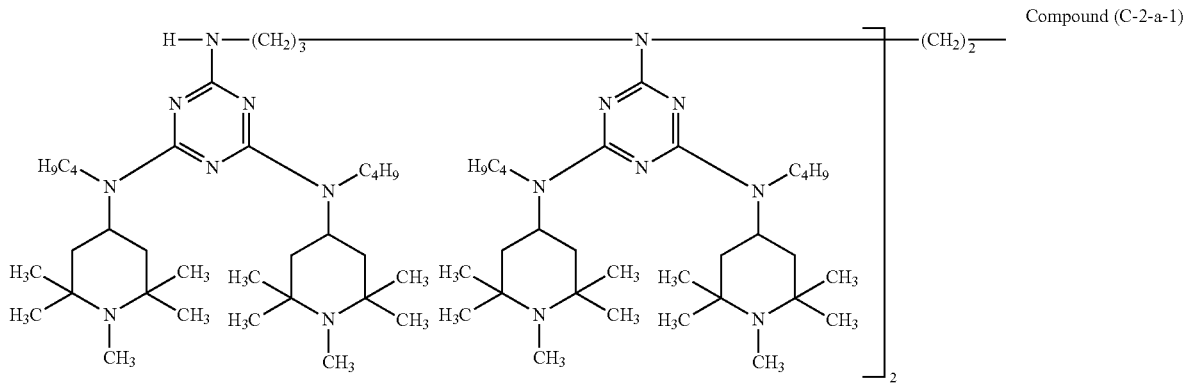

EXAMPLE 1

Polypropylene (Moplen HP 451 N®; Basell), the light stabilizers indicated in Table 1, and a pigment (0.07% by weight, relative to the weight of the polypropylene, of CROMOPHTAL Blue 4GNP® and 0.035% by weight, relative to the weight of the polypropylene, of CROMOPHTAL Yellow 3GNP®) are mixed in a high speed mixer at room temperature. The mixture obtained is compounded at 230° C. in a twin screw extruder. Spinning at 240° C. gives fibers of 5 Denier per filament and a draw ratio of 1:3.2.

The filaments obtained are exposed in a Xenon arc light Weather-Ometer (0.35 W/m² at 340 nm, black panel temperature: 63° C., dry conditions).

The exposure time corresponding to 50% retained tenacity (loss of mechanical properties) is a measure for the efficiency of the light stabilizers. The results are shown in Table 1.

TABLE 1

| Light stabilizer(s) | hours until 50% retained tenacity |
| --- | --- |
| None | 300 |
| 0.5% of Compound (B-1-a-1) | 1700 |
| 0.5% of Compound (C-1-b-1) | 1700 |
| 0.25% of Compound (B-1-a-1) plus 0.25% of Compound (C-1-b-1) | 2150 |

EXAMPLE 2

Polypropylene (Moplen HP 551M®; Basell), the light stabilizers indicated in Table 2, and TiO$_2$ (0.25% by weight, relative to the weight of the polypropylene) are mixed in a high speed mixer at room temperature. The mixture obtained is compounded at 230° C. in a twin screw extruder. Spinning at 240° C. gives a 180 Denier yarn of 4.5 Denier per filament with a draw ratio of 1:3.2.

The yarns obtained are exposed in a Xenon arc light Weather-Ometer (0.35 W/m² at 340 nm, black panel temperature: 63° C., dry conditions).

The exposure time corresponding to 50% retained tenacity (loss of mechanical properties) is a measure for the efficiency of the light stabilizers. The results are shown in Table 2.

TABLE 2

| Light stabilizer(s) | hours until 50% retained tenacity |
| --- | --- |
| None | 600 |
| 0.3% of Compound (C-1-b-1) | 2500 |
| 0.3% of Compound (B-1-a-1) | 1550 |
| 0.15% of Compound (C-1-b-1) plus 0.15% of Compound (B-1-a-1) | 2800 |

EXAMPLE 3

Polypropylene (Moplen HP 551M®; Basell), the light stabilizers indicated in Table 3 and Ciba®CROMOPHTAL®Red BNFP® pigment (0.15% by weight, relative to the weight of the polypropylene) are mixed in a high speed mixer at room temperature. The mixture obtained is compounded at 230° C. in a twin screw extruder. Spinning at 240° C. gives a 180 Denier yarn of 4.5 Denier per filament with a draw ratio of 1:3.2.

The yarns obtained are exposed in a Xenon arc light Weather-Ometer (0.35 W/m² at 340 nm, black panel temperature: 63° C., dry conditions).

The exposure time corresponding to 50% retained tenacity (loss of mechanical properties) is a measure for the efficiency of the light stabilizers. The results are shown in Table 3.

TABLE 3

| Light stabilizer(s) | hours until 50% retained tenacity |
| --- | --- |
| None | 300 |
| 0.3% of Compound (C-2-a-1) | 850 |
| 0.3% of Compound (B-1-a-1) | 550 |
| 0.15% of Compound (C-2-a-1) plus 0.15% of Compound (B-1-a-1) | 950 |

EXAMPLE 4

Polypropylene (Moplen HP 551M®; Basell), the light stabilizers indicated in Table 4 Ciba®CROMOPHTAL®Red BNFP® pigment (0.15% by weight, relative to the weight of the polypropylene) are mixed in a high speed mixer at room temperature. The mixture obtained is compounded at 230° C. in a twin screw extruder. Spinning at 240° C. gives a 180 Denier yarn of 4.5 Denier per filament with a draw ratio of 1:3.2.

The yarns obtained are exposed in a Xenon arc light Weather-Ometer (0.35 W/m² at 340 nm, black panel temperature: 63° C., dry conditions).

The exposure time corresponding to 50% retained tenacity (loss of mechanical properties) is a measure for the efficiency of the light stabilizers. The results are shown in Table 4.

TABLE 4

| Light stabilizer(s) | hours until 50% retained tenacity |
| --- | --- |
| None | 300 |
| 0.6% of Compound (C-1-b-1) | 1300 |
| 0.6% of Compound (B-1-a-1) | 1150 |
| 0.3% of Compound (C-1-b-1) plus 0.3% of Compound (B-1-a-1) | 1700 |

EXAMPLE 5

Polypropylene (Moplen HP 551M®; Basell), the light stabilizers indicated in Table 5 and Ciba®CROMOPHTAL®Red BNFP® pigment (0.15% by weight, relative to the weight of the polypropylene) are mixed in a high speed mixer at room temperature. The mixture obtained is compounded at 230° C. in a twin screw extruder. Spinning at 240° C. gives a 180 Denier yarn of 4.5 Denier per filament with a draw ratio of 1:3.2.

The yarns obtained are exposed in a Xenon arc light Weather-Ometer (0.45 W/m² at 340 nm, black standard temperature: 100° C., dry conditions).

The exposure time corresponding to 50% retained tenacity (loss of mechanical properties) at increased temperature is a measure for the efficiency of the light stabilizers in hot light environment. The results are shown in Table 5.

TABLE 5

| Light stabilizer(s) | hours until 50% retained tenacity |
| --- | --- |
| None | 150 |
| 0.6% of Compound (C-1-b-1) | 600 |
| 0.6% of Compound (B-1-a-1) | 475 |
| 0.3% of Compound (C-1-b-1) plus 0.3% of Compound (B-1-a-1) | 600 |

EXAMPLE 6

Polypropylene (Moplen HP 551M®; Basell), the light stabilizers indicated in Table 6, and $TiO_2$ (0.25% by weight, relative to the weight of the polypropylene) are mixed in a high speed mixer at room temperature. The mixture obtained is compounded at 230° C. in a twin screw extruder. Spinning at 240° C. gives a 400 Denier yarn of 10 Denier per filament with a draw ratio of 1:3.2.

The yarns obtained are exposed in a Xenon arc light Weather-Ometer (0.45 W/m² at 340 nm, black standard temperature: 100° C., dry conditions).

The exposure time corresponding to 50% retained tenacity (loss of mechanical properties) at increased temperature is a measure for the efficiency of the light stabilizers in hot light environment. The results are shown in Tables 6a and 6b.

TABLE 6a

| Light stabilizer(s) | hours until 50% retained tenacity |
| --- | --- |
| None | <380 |
| 0.3% of Compound (C-1-b-1) | 1050 |
| 0.3% of Compound (B-1-a-1) | 700 |
| 0.15% of Compound (C-1-b-1) plus 0.15% of Compound (B-1-a-1) | 1100 |

TABLE 6b

| Light stabilizer(s) | hours until 50% retained tenacity |
| --- | --- |
| None | <380 |
| 0.15% of Compound (C-1-b-1) plus 0.15% of Compound (B-1-a-2) | 880 |
| 0.15% of Compound (C-1-b-1) plus 0.15% of Compound (B-1-b-1) | 1050 |
| 0.15% of Compound (C-1-b-1) plus 0.15% of Compound (B-1-a-3) | 1100 |

EXAMPLE 7

Polypropylene (Moplen HP 551M®; Basell), the light stabilizers indicated in Table 7, and $TiO_2$ (0.25% by weight, relative to the weight of the polypropylene) are mixed in a high speed mixer at room temperature. The mixture obtained is compounded at 230° C. in a twin screw extruder. Spinning at 240° C. gives a 400 Denier yarn of 10 Denier per filament with a draw ratio of 1:3.2.

The yarns obtained are treated with X SBR Latex and annealed at 120° C. for 20 min. Afterwards they are exposed in a Xenon arc light Weather-Ometer (0.35 W/m² at 340 nm, black panel temperature: 63° C., dry conditions).

The exposure time corresponding to 50% retained tenacity (loss of mechanical properties) is a measure for the efficiency of the light stabilizers in yarns with contact to a latex binder. The results are shown in Table 7.

TABLE 7

| Light stabilizer(s) | hours until 50% retained tenacity |
| --- | --- |
| None | <150 |
| 0.3% of Compound (C-1-b-1) | 620 |
| 0.3% of Compound (B-1-a-1) | 580 |
| 0.15% of Compound (C-1-b-1) plus 0.15% of Compound (B-1-a-1) | 700 |

EXAMPLE 8

Polyethylene (Dowlex SC 2108®; DOW) and the light stabilizers indicated in Table 8 are mixed in a high speed mixer at room temperature. The mixture obtained is compounded at 200° C. in a twin screw extruder. Cast fim extrusion at 190° C., slitting and drawing gives tape filaments with 3600 Denier The filaments obtained are treated with SBR rubber for 100 h at 70° C. and afterwards exposed in a fluorescence weathering device (0.77 W/m² at 340 nm, periodically 8 h at 60° C., 4 h condensation phase at 50° C.). SBR rubber treatment is repeated every 250 h for 24 h.

The exposure time corresponding to time to surface cracking (change of optical properties) is a measure for the efficiency of the light stabilizers. The results are shown in Table 8.

TABLE 8

| Light stabilizer(s) | hours to surface cracking |
| --- | --- |
| None | 500 |
| 0.6% of Compound (C-1-b-1) | 3000 |
| 0.6% of Compound (B-1-a-1) | 3350 |
| 0.3% of Compound (C-1-b-1) plus 0.3% of Compound (B-1-a-1) | 3350 |

EXAMPLE 9

Polyethylene (Dowlex SC 2108®; DOW) and the light stabilizers indicated in Table 9 are mixed in a high speed mixer at room temperature. The mixture obtained is compounded at 200° C. in a twin screw extruder. Cast fim extrusion at 220° C., slitting and drawing gives tape filaments with 900 Denier.

The filaments obtained are exposed in a fluorescence weathering device (0.63 W/m² at 313 nm, periodically 8 h at 60° C., 4 h condensation phase at 50° C.).

The exposure time corresponding to 50% retained tenacity (loss of mechanical properties) is a measure for the efficiency of the light stabilizers. The results are shown in Table 9.

TABLE 9

| Light stabilizer(s) | hours until 50% retained tenacity |
| --- | --- |
| None | 250 |
| 0.6% of Compound (C-1-b-1) | 1320 |

TABLE 9-continued

| Light stabilizer(s) | hours until 50% retained tenacity |
|---|---|
| 0.6% of Compound (B-1-a-1) | 1300 |
| 0.3% of Compound (C-1-b-1) plus 0.3% of Compound (B-1-a-1) | 1400 |

The invention claimed is:

1. A multifilament, a monofilament, a non-woven or a tape, each having 1 to 2000 Denier per filament and a draw ratio of 1:2 to 1:11 and each made of a composition comprising
(A) a polyolefin,
(B) a compound of the formula (B-1-a-1),

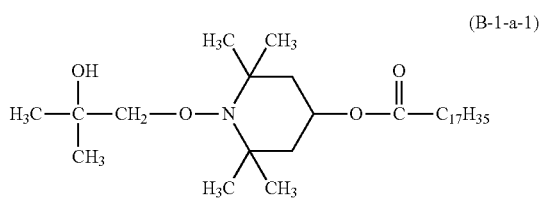

(C) a compound of the formula (C-1-b-1),

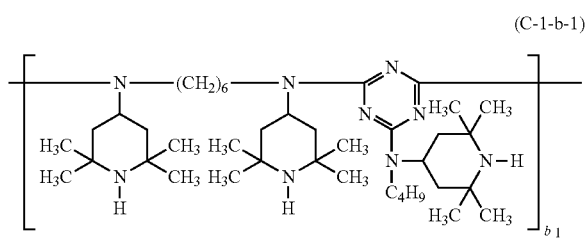

wherein $b_1$ is a number from 2 to 20

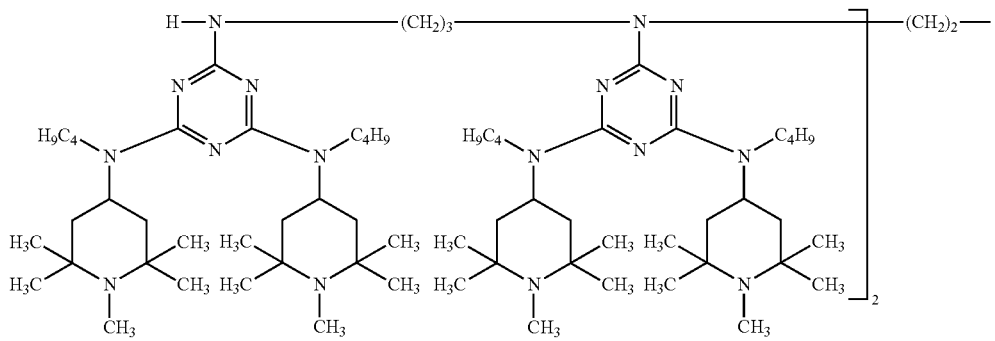

and optionally
(D) one or more inorganic and/or organic pigments, wherein the multifilament, the monofilament, the nonwoven or the tape contains 0.025 to 1.5% by weight of (B) and 0.025 to 1.5% by weight of (C), each relative to the weight of (A).

2. The multifilament, monofilament, non-woven or tape according to claim 1, wherein
said polyolefin (A) is selected from the group consisting of polyethylene, polypropylene, an ethylene copolymer or a propylene copolymer or mixtures thereof.

3. The multifilament, monofilament, non-woven or tape according to claim 1, comprising components (A), (B), (C) and (D).

4. An artificial turf comprising the multifilament, monofilament, non-woven or tape according to claim 3.

5. An artificial turf comprising the multifilament, monofilament, non-woven or tape according to claim 3 wherein component D is at least one pigment selected from the group consisting of a pigment formulation containing C.I. Pigment Green 7 and C.I. Pigment Yellow 110; or a pigment formulation containing C.I. Pigment Green 7 and C.I. Pigment Yellow 128; or a pigment formulation containing C.I. Pigment Green 7 and C.I. Pigment Yellow 199; or a pigment formulation containing C.I. Pigment Green 7 and C.I. Pigment Yellow 34; or a pigment formulation containing C.I. Pigment Green 7 and C.I. Pigment Yellow 119; or a pigment formulation containing C.I. Pigment Green 7 and C.I. Pigment Yellow 150.

6. An artificial turf comprising the multifilament, monofilament, non-woven or tape according to claim 5 further comprising at least one shading component selected from the group consisting of C.I. Pigment Black 7, C.I. Pigment White 6, C.I. Pigment Red 101 and C.I. Pigment Blue 15:3.

7. The multifilament, monofilament, non-woven or tape according to claim 1, further comprising (E) an UV absorber.

8. The multifilament, monofilament, non-woven or tape according to claim 7, wherein said UV absorber is at least one selected from the group consisting of 2-(2'-hydroxyphenyl)benzotriazole, a 2-hydroxybenzophenone, an ester of substituted or unsubstituted benzoic acid, an acrylate, an oxamide, a 2-(2-hydroxyphenyl)-1,3,5-triazine, a monobenzoate of resorcinol or a formamidine.

9. An article comprising the multifilament, monofilament, non-woven or tape according to claim 1.

10. The article according to claim 9 which is selected from the group consisting of a carpet, a roofing membrane, a geotextile, an automotive polyolefin structure and a shade cloth.

11. An article comprising the multifilament, monofilament, non-woven or tape according to claim 1 being used in a construction adjacent to a latex or a rubber.

* * * * *

UNITED STATES PATENT AND TRADEMARK OFFICE
CERTIFICATE OF CORRECTION

PATENT NO. : 10,309,039 B2
APPLICATION NO. : 15/386395
DATED : June 4, 2019
INVENTOR(S) : Daniel Mueller et al.

It is certified that error appears in the above-identified patent and that said Letters Patent is hereby corrected as shown below:

In the Specification

Column 22, Line 50, "2" should read --2'--

Column 26, Line 57, "tridecylnnitrone" should read --tridecylnitrone--

Column 26, Line 59, "ocatadecyl" should read --octadecyl--

Column 28, Line 14, "tot" should read --to 1--

Column 28, Line 64, "rupper" should read --rubber--

Column 34, Line 18, "fim" should read --film--

Column 34, Line 49, "fim" should read --film--

In the Claims

Column 35, Line 64, "nonwoven" should read --non-woven--

Signed and Sealed this
Seventh Day of January, 2020

Andrei Iancu
*Director of the United States Patent and Trademark Office*